United States Patent [19]
Wallskog

[11] 3,807,219
[45] Apr. 30, 1974

[54] TESTER FOR PRESSURE-VACUUM GAS CAPS

[75] Inventor: Alan G. Wallskog, Prospect Heights, Ill.

[73] Assignee: E. Edelmann & Co., Skokie, Ill.

[22] Filed: June 5, 1972

[21] Appl. No.: 259,836

[52] U.S. Cl. .................................................. 73/40
[51] Int. Cl. ............................................ G03m 3/02
[58] Field of Search ...................... 73/40, 49.7, 49.8

[56] References Cited
UNITED STATES PATENTS

| | | | |
|---|---|---|---|
| 3,022,658 | 2/1962 | Black | 73/40 |
| 2,981,095 | 4/1961 | Eshbaugh | 73/40 |
| 2,940,301 | 6/1960 | Hughes et al. | 73/40 |
| 2,940,303 | 6/1960 | Enell | 73/49.7 X |
| 3,014,361 | 12/1961 | Black | 73/40 |

Primary Examiner—Richard C. Queisser
Assistant Examiner—Joseph W. Roskos

[57] ABSTRACT

A compact apparatus is provided for testing pressure-vacuum gas caps, at service stations, garages, etc. to determine whether the cap is suitable for use or should be replaced. The apparatus provides a system which may be selectively pressurized or evacuated manually to create different pressure conditions and includes an air chamber and a gauge for measuring the pressure conditions therein. A gas cap mounting fixture to which the gas cap to be tested can be mounted also is pneumatically connnected to the air chamber. In order to test a gas cap, it is mounted to the fixture, the pressure conditions in the system are varied, and the gauge read to determine from indicia thereon whether the cap is responding in an acceptable predetermined manner to these pressure conditions.

6 Claims, 3 Drawing Figures

PATENTED APR 30 1974  3,807,219
FIG. 1
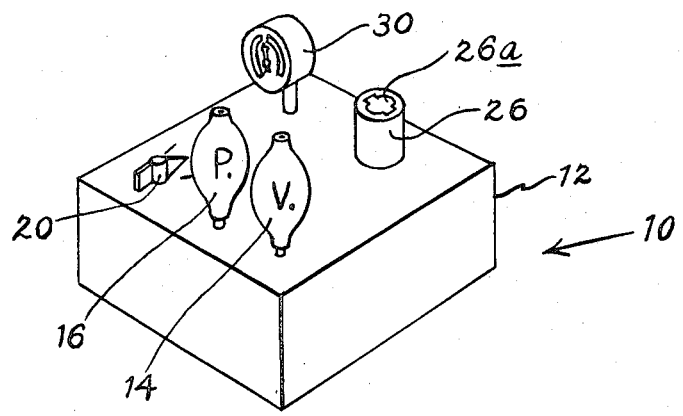
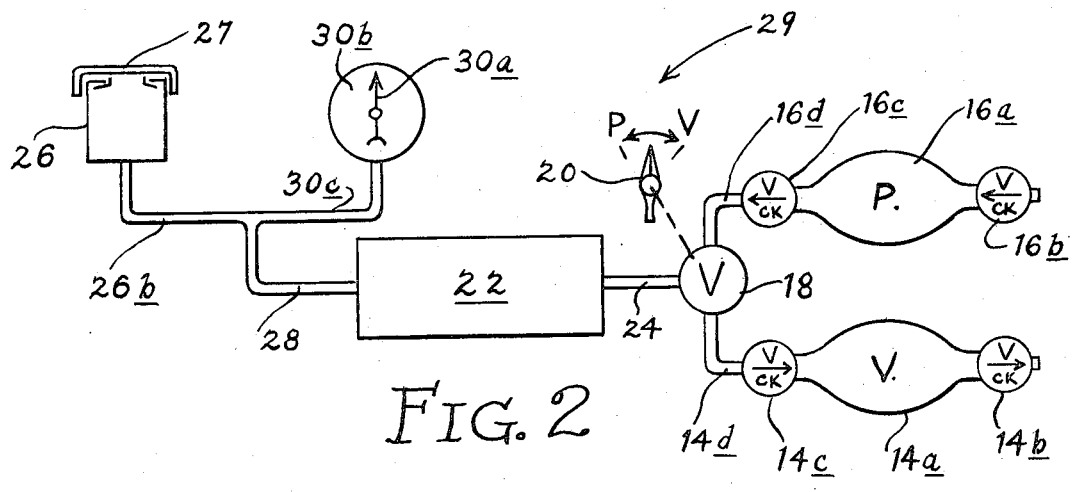
FIG. 2
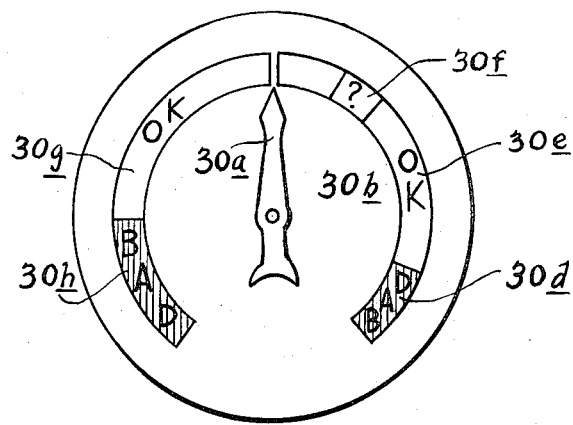
FIG. 3

TESTER FOR PRESSURE-VACUUM GAS CAPS

BACKGROUND OF THE INVENTION

This invention relates to testers for field use in determining whether automotive pressure-vacuum gas caps are suitable for continued use or should be replaced.

The strong emphasis on environmental quality as well as proper functioning of an automobile has, among other things, resulted in the design and adoption of pressure-vacuum gas caps. These caps include both a pressure valve and a vacuum valve each of which responds to varying pressure conditions in an automotive gas tank so as to assure desired operation of the automobile as well as meeting desired environmental quality standards.

The pressure valve is arranged to open as a safety measure in response to increased pressures in the gas tank, which could be caused such as by the expansion of air entrapped in the tank, or by the expansion of cold gasoline which is pumped into a warm tank. In either event, the increased pressure in the tank must be vented to prevent rupture of, or damage to the tank, or "flooding" of the carburetor. Once the pressure valve opens to vent the tank, it should remain open and provide a pressure flow rate sufficient to permit proper venting of the tank. As the pressure in the tank reduces the valve should provide a proper "leakage flow rate" until the pressure within the tank is reduced to a lower predetermined pressure at which the valve should close. After the valve closes, no further leakage can occur, thereby providing environmental integrity.

The vacuum valve vents the tank by providing an inflow of air so as to prevent the tank from collapsing or imploding due to a low pressure condition in the tank or to prevent fuel starvation of the engine. This valve is arranged to automatically close when the danger condition has been eliminated and to provide a predetermined "vacuum flow rate" when open.

Original equipment manufacturers presently use highly sophisticated testers for determining whether original equipment gas caps meet the predetermined opening and closing pressures, flow rates and leakage rates. However, at the present time no tester is available for use in the field such as at a service station or garage. Thus, although a cap may be known to operate properly when it leaves the original equipment manufacturer, there is no way of knowing whether it continues to operate properly once it is in the field.

It is therefore an object of this invention to provide a tester for use at service stations, garages, etc. to determine whether a pressure-vacuum gas cap is suitable for continued use or should be replaced.

A further object is to provide a small, compact and reliable tester which is suited for long life and easy use in the field.

SUMMARY OF THE INVENTION

There is provided by this invention a compact, inexpensive and readily used apparatus for testing pressure-vacuum gas caps in the field. The tester includes a closable and pressurizable system having an air chamber which may be pressurized or evacuated, a pressure gauge in communication with the air chamber for determining the pressure therein and a gas cap mounting fixture that is adapted to receive the gas cap to be tested and which communicates with the air chamber. The gauge is provided with indicia which indicates acceptable pressure valve and vacuum valve opening pressures and acceptable pressure valve closing pressure. By controlling the rate of pressurization or evacuation, the various flow rates can also be determined.

BRIEF DESCRIPTION OF THE DRAWINGS

FIG. 1 is a perspective view of a tester constructed in accordance with this invention;

FIG. 2 is a diagrammatic view showing the elements of the pressure system; and

FIG. 3 is a front view of the gauge face showing the indicia thereon which indicates the gas cap performance.

DESCRIPTION OF THE PREFERRED EMBODIMENT

Referring now to the drawings, the tester 10, generally, includes a housing 12 having mounted thereto a vacuum pump 14 and a pressure pump 16. In one embodiment the pressure pump 16 may be a flexible squeeze-type bulb 16a having at one end an inlet orifice and check valve 16b and at the other end a check valve 16c. A line or tube 16d connects the valve 16c with a three-way selector valve 18. The vacuum pump 14 may also be a squeeze-type bulb 14a having at one end a one-way check valve and outlet orifice 14b for communication with the atmosphere and at the other end a check valve 14c. The line or tube 14d connects to the bulb 14a at the valve 14c and to the three-way valve 18.

A controller handle 20 is connected to the three-way valve 18 so as to permit selective connection of the vacuum pump 14, or the pressure pump 16 to an air chamber 22 via the line 24. The air chamber 22 is of an appropriate size so as to act as an accumulator. With the selector handle 20 in the P position, the pressure pump 16 is connected with the air chamber 22. With the selector in the V position, the vacuum pump 14 is connected with the chamber 22.

A gas cap mounting fixture 26 having an orifice 26a which is adapted to receive a pressure-vacuum gas cap 27, is mounted to the housing 12 and communicates with the air chamber 22 via lines 26b and 28. A zero-center pressure gauge 30, which includes an arrow-like indicator 30a and a face 30b, is connected with the air pressure chamber 22 via lines 30c and 28. The pressurizable system 29 thus includes the vacuum pump 14, the pressure pump 16, the valve 18, the chamber 22, the mounting fixture 26, the gauge 30 and the interconnecting lines. Placement and securement of the gas cap 27 on the filler neck fixture 26 closes the system to permit testing of the cap.

The gauge face 30b includes circularly arranged indicia for indicating acceptable operation of the gas cap pressure and vacuum valves. The indicia includes an area 30d which indicates improper opening of the pressure valve. A corresponding area 30h indicates improper opening of the vacuum valve. The area 30f indicates, as explained hereinafter, an excessive pressure valve leakage rate, while area 30e indicates a proper pressure leakage rate.

In operation, if one were to test for proper pressure opening of a gas cap such as 27, the selector handle 20 would be moved to the P position to establish communication between the pressure pump 16 and chamber 22 via the three-way valve 18. As the bulb 16a is squeezed air is pumped through the valve 16c so as to increase the pressure in the air chamber 22. As the pressure in the system continues to build up the indicator 30a moves in a clockwise direction until the pressure valve in the gas cap 27 opens. When the pressure valve opens movement of the indicator 30a should stop. If the movement stops in the area designated BAD (30d), this would indicate that the valve opened above its threshold pressure and it would indicate that the cap 28 should be replaced. The upper acceptable pressure level or threshold between OK and BAD is approximately 40 inches of water. Assuming the pressure valve opened at the right pressure or below the BAD area, the next test would be to determine whether or not the valve provides an acceptable, minimum flow rate. This is determined by pressurizing the system at a known rate after the valve has opened; in one case this rate is approximately 0.5 SCFM (Standard Cubic Feet Per Minute). This is conveniently done with a squeeze-type bulb by adjusting the volume of the bulb so that by squeezing the bulb once per second after opening, there should be little, if any, build up of pressure which would cause the indicator 30a to move in a clockwise direction into the BAD area 30d. If the needle stays at its opening position or moves downwardly slightly, the flow rate of the valve can be assumed to be proper.

The next test which is applied to the cap is a pressure leakage rate in which pumping is stopped so that leakage from the system can only occur through the pressure valve in the gas cap 27. By timing the decay of pressure or leakage through the valve it can be determined if the rate is greater than the typical maximum of 3 cc/min. In one embodiment it is believed that once pumping is stopped the indicator should remain in the OK area 30e for 10 seconds. If the indicator drops into the questionable area 30f within 10 seconds the cap should be replaced.

Assuming these three tests to be positive, the pressure valve portion of the gas cap can be said to be operating properly.

In order to determine whether the vacuum valve is operating properly, the selector switch 20 is moved to the V position which thereby establishes communication between the vacuum pump 14 and the air chamber 22. The vacuum pump valve 14b is also a check valve and permits evacuation of the system. By squeezing the bulb 14a, the air in the system can be evacuated thereby causing the indicator 30a to move in a counterclockwise direction. The gas cap vacuum valve should open at a pressure within the area 30g designated as OK. If the valve does not open in that pressure range but opens at a pressure in the area 30h, the valve is determined to open at too low a pressure and is unacceptable. In practice, that low or threshold value is approximately minus 15 inches of water. In order to determine whether or not the vacuum valve provides a proper vacuum flow rate (i.e., .2 SCFM), the bulb 14a is squeezed at a rate of about one full squeeze per second. If the valve is not providing the proper flow rate, the pressure in the air chamber 22 will be reduced below the vacuum valve opening level and the indicator needle 30a will then swing further counterclockwise into the BAD area 30h.

The apparatus as described herein is particularly suitable and reliable for installation at field testing stations such as service stations, garages and the like. However, it will be appreciated that numerous changes and modifications can be made to the embodiment disclosed herein without departing from the spirit and scope of this invention.

What is claimed and desired to be secured by Letters Patent of the United States is:

1. In a field-tester, for testing the effectiveness of an automotive gas cap wherein the tester includes means defining an accumulator chamber that is adapted to communicate with a coupling to which the cap may be secured to simulate mounting on a vehicle, the improvement comprising, in combination: a single tester for checking both the pressure and vacuum character, relative to atmospheric pressure, of the gas cap, said tester including pressure gauge means and said coupling jointly communicating with each other and through a common line with said accumulator chamber, the pressure gauge means being capable of measuring pressures both above and below atmospheric pressure, and pressure varying and valve means for effecting a pressure or vacuum in said accumulator chamber, said pressure varying and valve means including separate pumping units for creating positive and negative pressure conditions in the accumulator chamber and a selector valve for selectively communicating only one of the pumping units to the accumulator chamber.

2. A device as in claim 1 wherein the pressure varying means includes two squeezable bulbs each provided with check valve means to insure air flow in one direction relative to the accumulator chamber; one bulb arranged to increase the pressure in the accumulator chamber and the other arranged to decrease the pressure in the accumulator chamber.

3. A device as in claim 2 wherein the bulb for increasing pressure is selected of such size as to produce a rate of air flow of about 0.5 standard cubic feet per minute.

4. A device as in claim 3 wherein the size of the bulb is selected so that squeezing the bulb at a rate of about once per second will produce the desired rate of air flow.

5. A device as in claim 1 wherein the gauge means provides thereon zones, defined by indicia, which show acceptable values for the following operations of the gas cap: pressure-valve opening, vacuum-valve opening, pressure flow rate, vacuum flow rate, and pressure leakage rate.

6. A device as in claim 5 wherein the pressure varying means are designed to provide a range of pressures between a high of about +40 inches of water and a low of about −15 inches of water relative to atmospheric conditions.

* * * * *